United States Patent [19]

Severson

[11] 4,167,935
[45] Sep. 18, 1979

[54] PHENOLIC LAMINATE SOLAR ABSORBER PANEL AND METHOD OF MAKING

[75] Inventor: Asbjorn M. Severson, Minneapolis, Minn.

[73] Assignee: Honeywell Inc., Minneapolis, Minn.

[21] Appl. No.: 836,802

[22] Filed: Sep. 26, 1977

[51] Int. Cl.² ............................................. F24J 3/02
[52] U.S. Cl. ................................. 126/450; 264/512; 264/521; 165/180
[58] Field of Search ................... 126/270, 271; 264/93, 264/94, 96, 248; 29/157.3 V, 421 R; 165/169, 170, 168, 180; 138/DIG. 7, 138; 428/292, 290

[56] References Cited

U.S. PATENT DOCUMENTS

| | | | |
|---|---|---|---|
| 2,482,525 | 9/1949 | Wachter | 428/290 X |
| 2,625,499 | 1/1953 | Nebesar | 138/DIG. 7 X |
| 3,103,789 | 9/1963 | McDuff et al. | 138/DIG. 7 X |
| 3,538,719 | 11/1970 | Pradel | 165/170 X |
| 3,620,902 | 11/1971 | Anderson | 428/292 |
| 3,935,358 | 1/1976 | Wyeth et al. | 264/94 X |
| 3,996,092 | 12/1976 | Sarazin et al. | 165/170 X |
| 4,076,873 | 2/1978 | Shea | 138/DIG. 7 X |

Primary Examiner—Samuel Scott
Assistant Examiner—Larry Jones
Attorney, Agent, or Firm—Charles G. Mersereau

[57] ABSTRACT

A solar flat plate absorber panel is molded from a laminate consisting of a suitable web material impregnated with a thermosetting phenolic resin. The absorber plate is pressure formed from superimposed layers of material and mold-cured to produce a unitary structure having a first or solar radiation absorbing surface on one side and an integral closed hollow lattice work of fluid heat transfer passages on the other or reverse side of the panel. The laminate web may be made from any suitable material such as paper, cloth, canvas or wire mesh which is easily impregnated with a thermosetting phenolic resin. In the preferred embodiment a B-stage phenol-formaldehyde resin is used. The two superimposed sheets of impregnated material are molded between heated platens of an hydraulic press to form an integral structure and fluid pressure between the sheets is utilized to mold the desired passage shape 5.

8 Claims, 5 Drawing Figures

U.S. Patent   Sep. 18, 1979   4,167,935
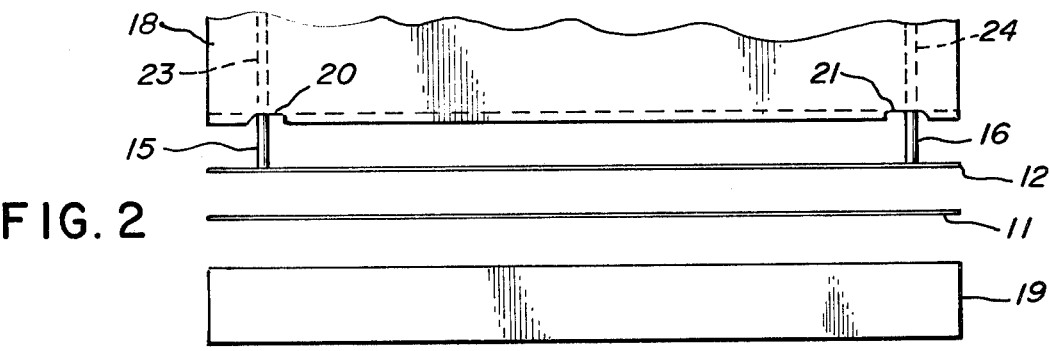
FIG. 2
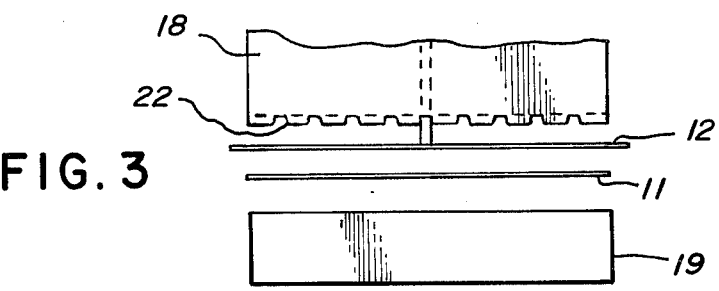
FIG. 3
FIG. 1A   FIG. 1   FIG. 1B
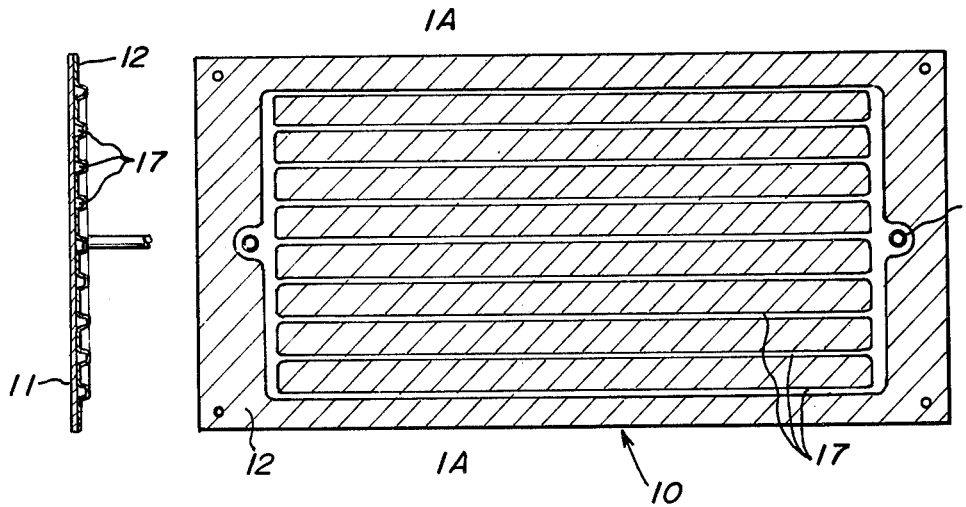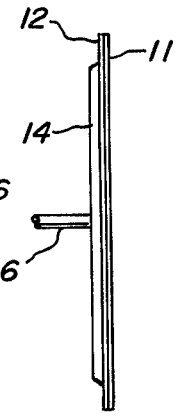

PHENOLIC LAMINATE SOLAR ABSORBER PANEL AND METHOD OF MAKING

BACKGROUND OF THE INVENTION

1. Field of the Invention

The present invention relates broadly to the field of solar energy utilization and, more particularly, to a mold-cured phenolic laminate solar absorber panel having an integral heat transfer passage system on the reverse side of the solar energy absorbing surface.

2. Description of the Prior Art

The rapid depletion of conventional sources of energy has resulted in an ever-widening search for alternatives to conventional sources such as petroleum and natural gas to meet the increasing demand for energy by our society today. One such viable source which is presently commanding a great deal of attention and research, development and in the deployment of experimental units is that of solar energy. The use of solar flat plate collectors to extract heat from solar energy is becoming increasingly important. Solar flat plate collectors may be employed, inter alia, as sources of heat for homes and buildings and for maintaining an adequate supply of hot water in such installations.

In general, the prior art contains many examples of different ways to utilize solar energy absorbed by flat plate collectors of various types and configurations. Solar flat plate collectors normally consist of a solar absorber plate having a black body surface which absorbs heat from solar radiation combined with a heat transfer system which removes useful heat from the absorber plate and conducts it to a place where it is utilized or stored. Solar collector panels have been utilized to heat a variety of fluid media through heat transfer systems in conjunction solar absorber plates. The higher heat transfer coefficient of liquid media together with the higher heat capacity per unit volume exhibited by such materials as opposed to gaseous fluids results in the ability to obtain an efficient use of the solar energy absorbed.

One of the greatest drawbacks to wide spread deployment of heating systems utilizing solar flat plate collectors has been the higher cost of such systems relative to the present cost of competing conventional sources of energy. Thus, an important goal of present solar energy research is to reduce the cost of solar systems to the point where they become economically competitive with other forms of energy. One of the most costly items in putting together a fluid-type solar energy heating system lies in the cost of materials and fabrication for a long-lived absorber plate and heat transfer system. Such problems as wide-swinging temperature variations, corrosion and other factors have been difficult to overcome short of utilizing expensive materials and fabricating techniques.

SUMMARY OF THE INVENTION

In accordance with the present invention solar absorber panels with integral fluid heat transfer systems may be molded from low-cost phenolic resin impregnated web materials to achieve a strong, corrosion-resistant absorber panel which is relatively insensitive to the degrading effects of solar radiation and temperature variations. The material constituting the reinforcing web is dictated by the particular application involved and may be paper, cloth, woven wire mesh, glass, asbestos fibers or other conventional material. The web material, before molding is impregnated by a thermosetting resin, normally, a B-stage phenolic resin to form the laminate which is utilized as the material of construction for the solar absorber panel of the present invention. In the preferred embodiment, a pair of thin sheets of the phenolic laminate material are pressed together between heated platens of an hydraulic press in a manner in which the lattice work of fluid heat transfer passages is formed and isolated on the reverse side of the solar absorbing surface. The phenolic resin is cured to a thermoset C-stage crosslinked polymer to produce a low-cost, corrosion-resistant relatively strong solar absorber panel.

In the preferred method, a pair of layers of paper or other web material impregnated with a B-stage phenol-formaldehyde resin are placed between the platens of an hydraulic press. One of the platens is recessed in the shape of the desired hollow fluid flow heat transfer passage lattice network and the other is planer to produce the flat solar energy absorbing surface. The platens are heated to a temperature between about 280° F. to about 380° F. and the press pressure utilized is between approximately 500 psi and 3,000 psi following conventional phenolic laminate molding techniques. To assure that the configuration of the internal fluid heat transfer passage system follow the detail of the recessed pattern on one platen, high pressure air or other suitable fluid is injected into the mold between the laminate layers as they are pressed so that the corresponding adjacent plated form is followed by each layer. The curing, crosslinking reaction is completed and the molded phenolic laminate absorber plates are removed from the mold.

The desired solar energy absorbing surface coating is then applied to the absorbing surface. It should be noted that temperatures, pressures and times of reaction will vary with the particular resin formula utilized, the web or filler material, and the thickness of the laminar sheets.

The internal strength imparted by the web material allows the sheets to be made in very thin sections, however, and these normally are in the range of from 0.010 inches to about 0.05 inches thick. The final pressed sheets may be a single laminate layer or made up of a plurality of layers of impregnated web laminated together to achieve the desired absorber plate thickness.

BRIEF DESCRIPTION OF THE DRAWINGS

In the drawings wherein like numerals are utilized to designate like parts through the same:

FIG. 1 represents a solar absorber panel fabricated in accordance with the techniques of the present invention;

FIGS. 1A and 1B represent sectional views through the solar absorber panel of FIG. 1;

FIGS. 2 and 3 represent exploded elevational views showing the method of making the solar abosrber panel of FIG. 1.

DESCRIPTION OF A PREFERRED EMBODIMENT

FIGS. 1, 1A and 1B depict a solar absorber plate produced in the manner of the present invention. As best seen in FIGS. 1A and 1B the panel shown generally at 10 consists of a pair of superimposed sheets of material 11 and 12. A hollow fluid flow passage lattice network includes inlet and outlet collectors 13 and 14 having connectors 15 and 16 respectively, which communicate with the interior. They are joined by a plurality of juxtaposed connecting passages 17. The entire structure is formed into a unitary member.

FIGS. 2 and 3 depict opposite platens of an hydraulic press including an upper or top platen 19 utilized to form the molded configuration of the solar absorber plate 10. Accesses as at 23 and 24 are provided to allow the introduction of a fluid pressurizing medium between sheets 11 and 12 through connectors 15 and 16.

In making the solar flat plate absorber panels of the present invention, thin sheets of a web material impregnated with partially cured or B-stage phenolic resin are utilized for the material of construction. A pair of thin sheets of such material cut to the desired geometrical configuration are utilized to make each panel in the preferred embodiment. The pair of sheets are placed between the platens 18 and 19 (FIGS. 2 and 3) of an hydraulic press. As can be seen in the drawings, plate 18 is recessed in the form of a lattice network which is identical to that desired for the heat transfer fluid flow passage configuration of the finished solar absorber panel. Thus, recesses 20 and 21 corresponding to the desired inlet and outlet headers 13 and 14 are provided together with a large number of recesses 22 FIG. 3 which are shown at approximately right angles to recesses 20 and 21 and, in turn, are used to provide the shape of the passages joining the two headers to form a total heat transfer passage network.

The platens are heated to a temperature of from between 280 and 380 degrees F. and the partially cured sheets 11 and 12 are superimposed between the platens. Connectors 15 and 16 have been previously secured to the sheet 12. After the superimposed sheets 11 and 12 are placed between the platens 18 and 19 the mold is closed and the pressure slowly increased. As the mold pressure is increased high pressure (200 psi–1000 psi) air or other suitably compatible fluid is caused to flow through one or more of the openings 23 and 24 to pressurize the two superimposed sheets internally such that sheet 12 is forced against the recesses in the platen 18 such that it assumes the form of the configuration of the recesses in the platen 18. Of course, if both accesses 23 and 24 are used to pressurize the system they will be connected to the same pressure source and if only one is utilized, the other will be suitably closed. As the desired configuration is reached, the press pressure is brought up a sufficient pressure such that mold-curing produces a unitary resulting structure. This is normally between 500 and 3,000 psi depending upon the precise nature of the sheets being molded.

The pressure is held until the thermosetting phenolic resin is fully crosslinked or cured to form a C-stage resin. In this state the resin is fully crosslinked and a rigid, strong, heat-resistant material formed. The press pressure is then reduced, the platens opened and the fully cured, molded phenolic resin solar absorber panel removed and cooled. The in situ curing of the phenolic laminate produces a unitary structure wherein the areas 25 between the passages 17 along with the periphery of the unit are actually crosslinked into a single unitary structure. The internal pressure preserves the hollowness of the entire fluid passage system and assures its continuity.

While many different formulas of phenolic resins are possible, the preferred embodiment utilizes a canvas web impregnated with a B-stage phenol-formaldehyde resin such as that obtainable from Spaulding Fiber Co. of Wheeling, Illinois. The resin in the partially cured or B-stage state is solid and insoluble but swelled by solvents. It is infusible but softened by heat such that at the 280° F. to 380° F. temperature utilized the resin is sufficiently softened such that it may be shaped and reformed by the applied internal pressure. When heat is applied, the crosslinking of the B-stage resin continues until the fully cured infusible, insoluble crosslinked state is reached. While the speed with which the phenolic resin reaches the required molecular weight and degree of crosslinking varies with temperature, pH, resin formulation, or structure, resins of the type preferred in the present invention will cure at the termperature involved in a few minutes.

The cured unitary body of the solar absorber plate of the present invention is then ready for placement as the absorbing surface and heat transfer mechanism of a solar flat plate collector after the solar absorbing surface of the original sheet 11 is coated, if necessary, with the desired solar absorber coating medium.

While the mold-cured solar absorber plate of the invention is normally coated with a selective solar radiation absorbing material after formation, the techniques may be employed. For example, a material such as a pre-coated or treated metallic member may be inserted between the lower laminated sheet 11 and the platen 19 to produce an integral solar absorbing surface to the solar absorber.

While the preferred web material is suitable paper or canvas as other cloth, depending upon the particular structural and environmental requirements of the solar absorber panel being fabricated, other webbing materials such as woven wire mesh, glass or asbestos fibers or other suitable material may be used. Also other formulations of phenolic resins may be utilized. The sheets may be in the form of a single thickness of impregnated web material as a plurality of such thickness pressed together in superimposed relationship.

One of the distinct advantages of the solar absorber panel of the present invention lies in the generally low cost of mass produced, commonly available phenolic resin laminates together with the relatively little amount of labor required to mold the absorber panel. The panels appear to be a great deal cheaper than panels fabricated of welded or brazed metals and are highly resistant to corrosion by commonly used liquid head transfer media than conventional materials such as steel. The panel should have an extremely long life in a normal solar absorbing environment as the phenol-formaldehyde resin is not only corrosion-resistant, but also is not affected by ultra-violet light as is the case with many other polymeric molecular structures.

The solar absorber panel of the present invention also overcomes concerns about the heat conducting of phenol-formaldehyde resin materials. For many years phenolic resins have, of course, been used to insulate materials both from heat and electrical conductivity. However, inasmuch as phenolic laminate sheets as thin as from about 0.02 inches to about 0.05 inches can be utilized to produce solar absorber panels in accordance with the present invention, and because a very large number of small passages 17 are normally molded into the structure, the conductivity of heat through the phenol-formaldehyde resin does not present a serious problem to the efficient collection of solar energy by the absorber plate of the invention.

The embodiments of the invention in which an exclusive property or right is claimed are defined as follows:

1. A solar flat plate abosrber panel comprising:

an absorber member formed from a superimposed pair of resin impregnated reinforcing web members impregnated with a B-stage thermosetting phenolic resin cured to form a laiminated homogeneous, composite unitary C-stage phenolic resin structure having a surface for receiving and absorbing solar radiation energy, and an integral fluid heat transfer system for conducting away said absorbed heat energy.

2. The solar flat plate absorber panel of claim 1 wherein said web material is paper.

3. The solar plate absorber of claim 1 wherein said web material is cloth.

4. The solar flat plate absorber panel of claim 1 wherein said web material is wire mesh.

5. The solar flat plate absorber panel of claim 1 wherein said web is a material from the group consisting of glass fibers and asbestos fibers.

6. The solar flat plate absorber panel of claim 1 wherein said thermosetting phenolic resin is a phenol-formaldehyde polymer.

7. A method of fabricating a flat plate solar energy absorbing panel comprising the steps of:

superimposing a pair of B-stage phenolic resin impregnated web members of a desired shape between the platens of a press wherein one of said platens has a substantially planer surface and the other of said platens contains recesses in the configuration of a fluid flow lattice pattern;

simultaneously subjecting said superimposed members to heat and pressure between said platens of said press while subjecting the internal area between said members to sufficient fluid pressure to shape said members in the form of the patterns described by said platens forming thereby hollow internal fluid flow passages;

subjecting said superimposed members to sufficient heat and pressure to mold and cure said members together forming a unitary homogeneous structure of impregnated C-stage phenolic resin structure having hollow internal passages in the form of said lattice pattern.

8. The method of claim 7 further comprising the step of inserting a metallic solar energy absorbing member between said substantially planer platen and said phenolic resin impregnated web members.

* * * * *

UNITED STATES PATENT OFFICE
CERTIFICATE OF CORRECTION

PATENT NO. : 4,167,935

DATED : September 18, 1979

INVENTOR(S) : ASBJORN M. SEVERSON

It is certified that error appears in the above—identified patent and that said Letters Patent are hereby corrected as shown below:

Claim 1, line 3 of column 5, cancel "impregnated with" and substitute therefor --said resin is--.

Signed and Sealed this

Eighteenth Day of December 1979

[SEAL]

Attest:

SIDNEY A. DIAMOND

Attesting Officer

Commissioner of Patents and Trademarks